(12) United States Patent
Zeulner

(10) Patent No.: US 10,914,626 B2
(45) Date of Patent: Feb. 9, 2021

(54) PORTABLE MEASURING UNIT

(71) Applicant: CONCEPT LASER GMBH, Lichtenfels (DE)

(72) Inventor: Fabian Zeulner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 16/104,515

(22) Filed: Aug. 17, 2018

(65) Prior Publication Data
US 2019/0063991 A1    Feb. 28, 2019

(30) Foreign Application Priority Data

Aug. 25, 2017 (EP) ..................................... 17187988

(51) Int. Cl.
*G01J 1/42* (2006.01)
*B29C 64/393* (2017.01)
(Continued)

(52) U.S. Cl.
CPC .......... *G01J 1/4257* (2013.01); *B29C 64/153* (2017.08); *B29C 64/264* (2017.08); *B29C 64/30* (2017.08); *B29C 64/393* (2017.08); *B33Y 30/00* (2014.12); *B33Y 40/00* (2014.12); *B33Y 50/02* (2014.12); *G01B 5/0002* (2013.01); *B22F 2003/1057* (2013.01)

(58) Field of Classification Search
CPC ..... G01J 1/4257; G01B 5/0002; B33Y 50/02; B33Y 40/00; B29C 64/264; B29C 64/153; B29C 64/30; B29C 64/393; B22F 2003/1057
See application file for complete search history.

(56) References Cited

U.S. PATENT DOCUMENTS

| 5,832,415 | A | 11/1998 | Wilkening et al. |
| 7,052,263 | B2 * | 5/2006 | John ..................... B29C 64/129 425/174.4 |

(Continued)

FOREIGN PATENT DOCUMENTS

| CN | 102105291 A | 6/2011 |
| CN | 104487257 A | 4/2015 |

(Continued)

OTHER PUBLICATIONS

European Patent Office Search Report Corresponding to Application No. 171879885 dated Feb. 7, 2018.

(Continued)

*Primary Examiner* — Sang H Nguyen
(74) *Attorney, Agent, or Firm* — Dority & Manning, P.A.

(57) ABSTRACT

Portable measuring unit (1) for performing a measuring process for an apparatus for additively manufacturing of three-dimensional objects by means of successive layerwise selective irradiation and consolidation of layers of a build material which can be consolidated by means of an energy beam, with a holding unit (2) configured for holding an image detection unit (3) in a position relative to a sample, wherein the image detection unit (3) is configured to measure an irradiation pattern of the sample (10) previously irradiated by the apparatus, wherein the portable measuring unit (1) is arbitrarily assignable to the or an apparatus.

11 Claims, 1 Drawing Sheet

(51) Int. Cl.
   *B33Y 50/02* (2015.01)
   *G01B 5/00* (2006.01)
   *B29C 64/30* (2017.01)
   *B33Y 40/00* (2020.01)
   *B29C 64/264* (2017.01)
   *B29C 64/153* (2017.01)
   *B33Y 30/00* (2015.01)
   *B22F 3/105* (2006.01)

(56) References Cited

U.S. PATENT DOCUMENTS

| | | | |
|---|---|---|---|
| 8,803,073 B2 | 8/2014 | Philippi | |
| 8,978,551 B2 | 3/2015 | Miller | |
| 10,336,008 B2 | 7/2019 | Perret et al. | |
| 2004/0179206 A1* | 9/2004 | Tassakos | G01B 11/00 |
| | | | 356/602 |
| 2010/0125356 A1* | 5/2010 | Shkolnik | G06T 1/00 |
| | | | 700/98 |
| 2012/0069960 A1* | 3/2012 | Kitagawa | A61B 6/025 |
| | | | 378/41 |
| 2014/0285798 A1* | 9/2014 | Nishimura | G01J 3/26 |
| | | | 356/300 |
| 2015/0226537 A1* | 8/2015 | Schorre | A61B 5/0066 |
| | | | 356/479 |
| 2016/0054115 A1* | 2/2016 | Snis | B23K 26/082 |
| | | | 419/55 |
| 2016/0288439 A1* | 10/2016 | Louko | B29D 35/122 |
| 2016/0299996 A1* | 10/2016 | Huang | G06F 11/0721 |
| 2017/0165921 A1 | 6/2017 | Fetter et al. | |
| 2017/0239892 A1* | 8/2017 | Buller | B29C 64/40 |

FOREIGN PATENT DOCUMENTS

| | | | |
|---|---|---|---|
| CN | 105358310 A | 2/2016 | |
| CN | 108362223 A | 8/2018 | |
| JP | H09511854 A | 11/1997 | |
| JP | 2007/255975 A | 10/2007 | |
| JP | 2018/036828 A | 3/2018 | |
| WO | 2016115095 A1 | 7/2016 | |

OTHER PUBLICATIONS

Machine Translated Japanese Office Action Corresponding to Application No. 2018001622 dated Dec. 18, 2018.

Combined Chinese Office Action and Search Report Corresponding to Application No. 2017111267696 dated Mar. 20, 2020.

* cited by examiner

PORTABLE MEASURING UNIT

CROSS-REFERENCE TO RELATED APPLICATIONS

This application claims priority to European Patent Application serial no. 17 187 988.5 filed Aug. 25, 2017, the contents of which is incorporated herein by reference in its entirety as if set forth verbatim.

FIELD OF THE INVENTION

The invention relates to a portable measuring unit for performing a measuring process for an apparatus for additively manufacturing of three-dimensional objects by means of successive layerwise selective irradiation and consolidation of layers of a build material which can be consolidated by means of an energy beam, with a holding unit configured for holding an image detection unit in a position relative to a sample, wherein the image detection unit is configured to measure an irradiation pattern generated on the sample by previously irradiating the sample by an energy beam, wherein the portable measuring unit is arbitrarily assignable to the or an apparatus.

BACKGROUND

Apparatuses for additively manufacturing three-dimensional objects are well known from prior art. It is frequently necessary to verify and/or maintain a calibration status of the apparatus to ensure the process quality in additively manufacturing of three-dimensional objects. To calibrate such apparatuses, typically a sample, for example a sheet-metal, is irradiated by means of the energy beam of the apparatus, wherein the pattern generated on the sample by irradiation is analyzed and/or compared with a defined pattern. Based on the deviations between the defined pattern (reference pattern) and the irradiated pattern calibration information can be generated to calibrate the apparatus.

Usually, the apparatus that has to be calibrated has to be used to irradiate such a sample on site by irradiating the pattern onto the sample with the energy beam of the apparatus that has to be calibrated. Subsequently, the user has to send the sample to the manufacturer of the apparatus to measure and/or analyze the sample. Based on the measurement it is possible to generate the respective calibration information and/or calibration data that can be used to calibrate the apparatus. Unfortunately, this leads to delays due to the shipping times of the sample. Additionally, the calibration can be verified only after the calibration information and/or calibration data have been received by the user and the apparatus has been calibrated. If further calibration is necessary, another sample has to be generated on site and sent to the manufacturer.

It is therefore, an object to the present invention to provide an improved calibration possibility for apparatuses for additively manufacturing three-dimensional objects.

SUMMARY OF THE INVENTION

The object is achieved by an apparatus according to claim 1. Advantageous embodiments of the apparatus are subject to the dependent claims.

The portable measuring unit is arbitrarily assignable, i.e. can arbitrarily assigned to the or an apparatus. Thus, the portable measuring unit can be taken to any and used with any arbitrary apparatus for additively manufacturing three-dimensional objects to measure an irradiated sample and therefore, generate calibration information. Hence, the shipping of samples to the manufacturer of the apparatus is not necessary, since the portable measuring unit can be taken to any arbitrary apparatus and/or any arbitrary production site to calibrate the respective apparatus or apparatuses directly on site. By way of the invention it is further possible, to verify the calibration of the apparatus by generating a sample based on the calibration information or in other words after the apparatus has been calibrated based on the calibration information another sample can be generated that can directly be measured on site by the portable measuring unit to verify the calibration information was correct and the calibration of the apparatus was successful.

As is apparent from above, the apparatus the portable measuring unit is configured to perform a measuring process for is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam.

The invention is based on the idea that a portable measuring unit is used that allows for performing a measuring process for an apparatus for additively manufacturing of three-dimensional objects directly on site. The measuring unit is mobile or portable, in particular portable by service personnel, and can therefore be taken to the apparatus that needs to be calibrated. Thus, it is not necessary to send a sample to the manufacturer of the apparatus for generating calibration information, since the portable measuring unit can be taken on site to measure the irradiation pattern of the sample that has been previously be irradiated by the apparatus. Thus, service personnel can calibrate the apparatus directly on site without the need for sending the sample to a site of the manufacturer.

The portable measuring unit comprises a holding unit that is configured for holding an image detection unit in a position relative to the sample. The image detection unit is configured to measure the irradiation pattern of the sample that has previously been irradiated by the apparatus. In other words, a sample that has been irradiated with the apparatus that has to be calibrated is positioned relative to the image detection unit, wherein the irradiation pattern on the sample is measured by the image detection unit. Thus, the deviations between the irradiated pattern and a predefined pattern or a target pattern can be determined. Based on these determined deviations calibration information can be generated that can be used to calibrate the apparatus, in particular irradiation unit of the apparatus.

According to an advantageous embodiment of the portable measuring unit, a base plate can be provided that is configured to hold and/or receive the sample in a measuring position. Hence, the base plate allows for a defined positioning of the sample relative to the image detection unit of the portable measuring unit, wherein a measuring position is provided on or in the base plate in which the sample can be positioned. Therefore, the relative position between the image detection unit and the sample is set/defined by the measuring position that allows for a defined measurement of the sample. The user or the service personnel performing the measuring process can insert the sample into the measuring position in or on the base plate, wherein afterwards the measuring process can be executed. Of course, multiple measuring positions can be provided so that multiple samples can be measured subsequently or at the same time.

According to an alternative embodiment of the portable measuring unit, the holding unit holds the image detection unit above the ground or the floor, wherein the sample is positioned in a measuring position on the ground or the floor. Advantageously, the portable measuring detection unit is configured to project positioning information on the ground or the floor that allows for a positioning of the sample in the measuring position. The positioning information can for example be a light pattern on the ground or the floor that shows the user of the portable measuring unit where the sample has to be placed and how the sample has to be oriented. Further, the portable measuring detection unit may comprise a leveling means to level the measuring position relative to the image detection unit or the image detection unit relative to the ground.

The portable measuring unit can further be improved, in that the base plate comprises a reception, in particular a recess or a groove, configured to receive the sample in a defined measuring position. Therefore, the base plate can comprise a reception for the irradiated sample in which the user of the portable measuring unit places the sample to achieve a defined relative position between the image detection unit and the sample. The reception may in particular be built as a recess or a groove in the base plate of the portable measuring unit, wherein it is of course possible, to provide any other form of reception, for example by using pins that are insertable in the surface of the base plate, wherein the sample is positioned by contacting the pins.

Further, the portable measuring unit can comprise a base plate that is segmented into at least two separable segments. Therefore, the base plate may be built of or may comprise separable segments that can be attached together to form the base plate. This embodiment allows for an improved portability as the base plate may be disassembled in the base plate segments and therefore, can better be transported, for example stowed in a container. The individual segments of the base plate may comprise connection elements, i.e. in particular magnetic and/or mechanical elements such as tongue and groove or slot and key elements that allow for a defined positioning and attachment/detachment of the single separable segments.

According to another advantageous embodiment of the portable measuring unit, the holding unit is detachably mounted with the image detection unit and/or the base plate. Hence, the holding unit can be unmounted or detached from the image detection unit and/or from the base plate. To move the portable measuring unit it, is advantageous to detach the components of the portable measuring unit from another to separately stow the components, in particular the image detection unit and the holding unit. Thus, the comfort of the user of the portable measuring unit in transporting the portable measuring unit can be improved by reducing the overall size of the portable measuring unit in the detached or unmounted state.

The portable measuring unit can further be improved in that the portable measuring unit is transferable between a mounted state and an unmounted state, wherein the image detection unit and the base plate are separably connected via the holding unit in the mounted state with the image detection unit arranged in a measuring position and with the image detection unit and/or the holding unit and/or the base plate being detached from another and/or repositioned relative to another in the unmounted state. According to this embodiment, a mounted state and an unmounted state are provided, wherein the portable measuring unit is ready for measurement in the mounted state, as the image detection unit is held by the holding unit in its measuring position. In particular, the image detection unit is positioned relative to the base plate and therefore, relative to the sample received in the measuring position on the base plate.

Further, the portable measuring unit can be improved in that the portable measuring unit is transferable from the mounted state into the unmounted state by means of detaching the image detection unit and/or the base plate and/or the holding unit and/or folding and/or telescoping and/or pivoting the image detection unit and/or the base plate and/or the holding unit. To transfer the portable measuring unit between the mounted state and the unmounted state, the individual components may be detached from another or the individual components may be positioned relative to another. In particular, the individual components may be detached from another or pivoted relative to another or the holding unit may be telescoped. Thus, the portable measuring unit may be reduced in size for improved transportability, in particular to better fit the inner dimensions of a container provided for transporting the portable measuring unit.

The portable measuring unit can further be improved in that the portable measuring unit is configured to determine a calibration status of the apparatus used to irradiate the sample from information generated by the image detection unit. Thus, the sample irradiated by the apparatus is measured by the image detection unit and analyzed and/or evaluated, for example by a control unit assigned to the portable measuring unit, in particular assigned to the image detection unit. The image detection unit may therefore, for example via the control unit, generate information that indicates the calibration status of the apparatus. For example the image detection unit can detect or measure whether the apparatus is correctly calibrated or not from the pattern irradiated on the sample.

Additionally, the portable measuring unit can be configured to generate calibration information for calibrating the apparatus. The portable measuring unit is configured to generate calibration information based on the measurement of the irradiated sample, wherein for example a comparison between a defined pattern and the irradiated pattern forms the basis for the generation of the calibration information. The calibration information can afterwards be used for calibrating the apparatus, in particular be transferred to the apparatus, wherein at least one process parameter of the apparatus is adjusted according to the calibration information, if the calibration information indicates that the measured pattern deviates from the defined pattern.

Besides, the image detection unit may be used to calibrate the portable measuring unit. Via an image captured by the image detection unit a calibration of the portable measuring unit itself is possible. Further, the image detection unit may comprise additional means, such as a leveling unit.

Another advantageous embodiment of the portable measuring unit suggests an interface that is configured to enable a communication between the portable measuring unit and the apparatus. The apparatus that is currently calibrated or for which a measurement process is performed can communicate with the portable measuring unit by way of the interface and vice versa. In particular, it is possible, to transfer the calibration information and/or various process parameters of the apparatus between the apparatus and the portable measuring unit. Hence, the calibration information can comprise suggestions or changes regarding individual process parameters that can be altered to improve the calibration status of the apparatus or to transfer the current calibration status into the defined calibration status of the apparatus.

Advantageously, the portable measuring unit can be improved in that the holding unit is a frame and/or a rod and/or a rod assembly. Essentially, the holding unit can provide a structure that is configured to hold the image detection unit in a predefined position. Via the holding unit a frame can be provided that stably holds the image detection unit. The holding unit can comprise a rod or a rod assembly, wherein the single rods may be attached to one another and/or the image detection unit and/or the base plate. Thus, the portable detection unit may be detached by detaching the single elements, in particular rods, of the holding unit to disassemble the portable measuring unit. The rods and/or the rod assembly can preferably be telescoped to reduce the overall size of the portable measuring unit and to allow for a comfortable transport of the portable measuring unit.

The portable measuring unit can further comprise a container configured to receive the portable measuring unit in the unmounted state. Hence, after transferring the portable measuring unit to the unmounted state it is possible, to insert or store the portable measuring unit in the container, wherein the individual components of the portable measuring unit may be transported safely and protected against environmental impacts.

Advantageously, the irradiation pattern irradiated on the sample by the apparatus is a grid. The deviations from the grid irradiated by the apparatus and the grid defined, i.e. a calibrated apparatus produces, result in the calibration status of the apparatus. Thus, the image detection unit is able to measure the deviations from the irradiated grid and the predefined grid to evaluate the calibration status of the apparatus.

Besides, the invention relates to a method for calibrating at least one apparatus for additively manufacturing three-dimensional objects by means of successive layerwise selective irradiation and consolidation of layers of a powdered build material which can be consolidated by means of an energy beam, in particular via a portable measuring unit as described before, wherein the following steps are executed:

Transfer of the portable measuring unit into a mounted state
Reference measurement
Calibration of the image detection unit
Positioning of the sample in the measuring position
Measuring of the sample
Evaluation of the measurement
Generation of a calibration information Hence, a user can use the portable measuring unit to evaluate the calibration status of an apparatus or to calibrate an apparatus for additively manufacturing three-dimensional objects directly on site, wherein the user at first needs to transfer the portable measuring unit into a mounted state. For example, the image detection unit needs to be attached to the holding structure. If the portable measuring unit comprises a base plate the holding structure needs to be attached to the base plate or the relative positions between image detection unit, holding structure and base plate need to be established.

Afterwards, a reference measurement is performed, wherein the portable measuring unit calibrates itself in that the image detection unit is calibrated. After the image detection unit is calibrated the sample that has been irradiated by the apparatus that has to be calibrated is positioned in the measuring position, for example in a reception in or on the base plate. The positioned sample can then be measured via the image detection unit.

The image detection unit generates corresponding information, in particular regarding deviations between the pattern of the irradiated sample and a defined pattern. Based on the deviations calibration information is generated that allows for calibrating the apparatus.

Preferably, the generated calibration information is transferred to the apparatus via an interface of the portable measuring unit. Thus, the portable measuring unit can be connected directly to the apparatus, for example via a cable or a wireless connection to directly transfer the calibration information and allow for a calibration of the apparatus.

BRIEF DESCRIPTION OF THE DRAWINGS

Exemplary embodiments of the invention are described with reference to the Fig. The Fig. are schematic diagrams, wherein.

DETAILED DESCRIPTION

Figure 1:
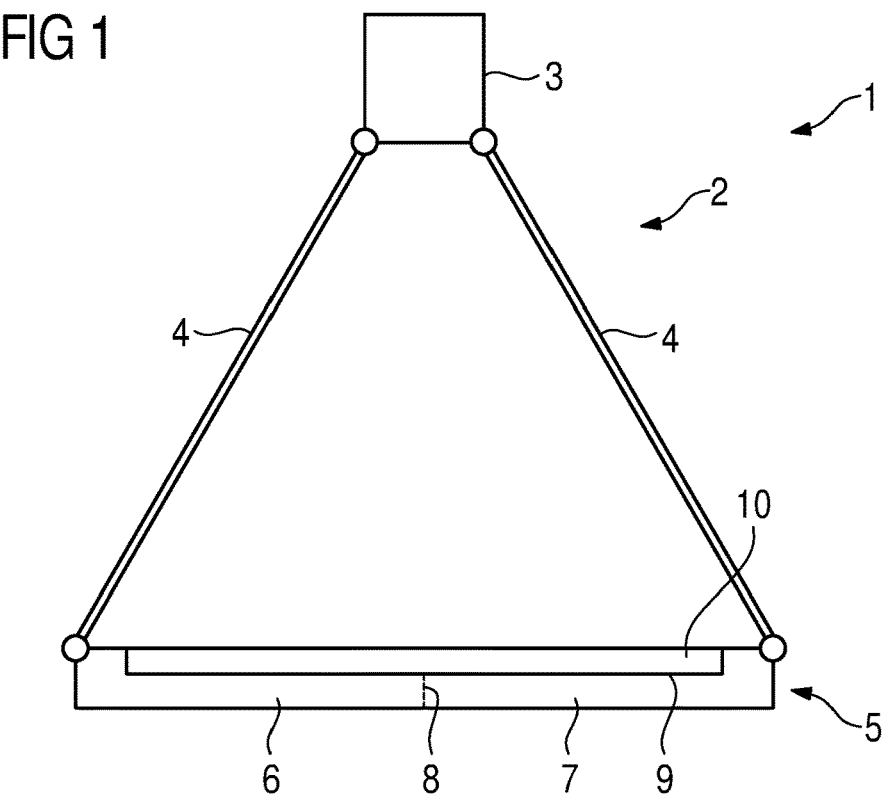
FIG. 1 shows an exemplary side view of a portable measuring unit in a mounted state.

FIG. 1 shows a portable measuring unit 1 for performing a measuring process for an apparatus for additively manufacturing of three-dimensional objects (not shown). The portable measuring unit 1 comprises a holding unit 2 for holding an image detection unit 3. The holding unit 2 comprises a rod assembly comprising a plurality of rods 4 (for example four). The image detection unit 3 is separably connected to the holding unit 2, wherein for example the upper ends of the rods 4 of the holding unit 2 are inserted in corresponding recesses in the image detection unit 3. The rods 4 are pivotably attached to a base plate 5 at their lower ends.

As is discernible from the Fig., the base plate 5 may be (optionally) segmented in two base plate segments 6, 7 that can be detached from another (depicted by a dashed line 8).

The base plate 5 further comprises a reception 9, exemplarily shown as a recess in the top surface of the base plate 5 configured to receive a sample 10.

The sample 10 is a sheet-metal that has been irradiated by an apparatus for additively manufacturing three-dimensional objects, which apparatus needs to be calibrated via the portable measuring unit 1. The sample 10 is inserted in the reception 9, thus, a defined relative position between the sample 10 and the image detection unit 3 is assured.

FIG. 1 shows the mounted state of the portable measuring unit 1 in which the sample 10 can be measured via the portable measuring unit 1. Therefore, the image detection unit 3 captures the pattern irradiated on the sample 10 via the apparatus that has to be calibrated. Based on the captured irradiated pattern an evaluation of the calibration status of the corresponding apparatus is possible.

The image detection unit 3 compares the irradiated pattern with a predefined pattern, for example stored in a data storage of the image detection unit 3. Based on the deviations between the predefined pattern and the irradiated pattern calibration information can be generated. The calibration information can afterwards be transferred to the apparatus, for example via a wired or wireless communication interface (not shown) that directly connects the portable measuring unit 1 to the apparatus.

Figure 2:
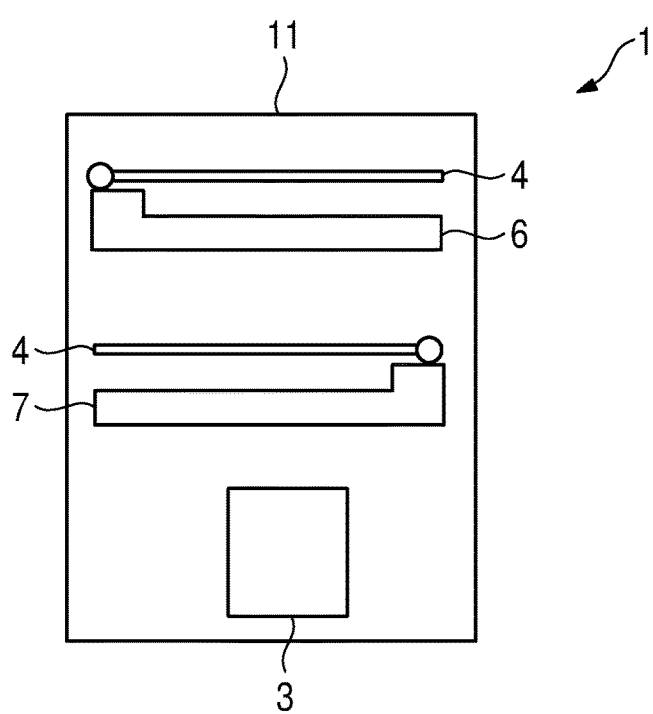
FIG. 2 shows an exemplary side view of the portable measuring unit of FIG. 1 and unmounted state.

The portable measuring unit 1 can be assigned to any arbitrary apparatus for manufacturing three-dimensional objects. If the portable measuring unit 1 has to be transported to another apparatus, the portable measuring unit 1 can be transferred from the mounted state (shown in FIG. 1) to the unmounted state (shown in FIG. 2). Hence, the image detection unit 3 can be detached from the holding structure 2 by removing the rods 4 from the image detection unit 3. The rods 4 can be pivoted at their lower ends and telescoped to reduce the length of the rods 4. Further, the base plate 5 can be separated into the base plate segments 6 and 7. In the unmounted state the portable measuring unit 1 is reduced in size and therefore fits in a container 11 that allows for a comfortable transport of the portable measuring unit 1.

The invention claimed is:

1. A portable measuring unit for an apparatus comprising an energy beam for additively manufacturing a three-dimensional object, the portable measuring unit comprising:
   an image detection unit configured to measure an irradiation pattern generated on a sample by previously irradiating the sample with the energy beam from the apparatus;
   a holding unit configured to hold the image detection unit in a position relative to the sample, wherein the image detection unit is detachable from the holding unit;
   a base plate configured to hold the sample; and,
   wherein the holding unit comprises a plurality of rods, wherein each of the plurality of rods comprises a first end detachably couplable to the image detection unit and a second end detachably couplable to the base plate.

2. The portable measuring unit of claim 1, wherein the base plate comprises a plurality of separable segments.

3. The portable measuring unit of claim 1, wherein the base plate comprises a reception to hold the sample.

4. The portable measuring unit of claim 3, wherein the reception comprises a recess in a top surface of the base plate.

5. The portable measuring unit of claim 1, wherein the plurality of rods are pivotably attached to a base plate.

6. The portable measuring unit of claim 1, wherein the plurality of rods are telescopically extendable and collapsible.

7. The portable measuring unit of claim 1, further comprise an interface configured to enable a communication between the portable measuring unit and the apparatus.

8. The portable measuring unit of claim 7, wherein the communication between the portable measuring unit and the apparatus is configured to calibrate the portable measuring unit.

9. A method for calibrating at least one apparatus comprising an energy beam for additively manufacturing three-dimensional objects, the method comprising:
   transferring a portable measuring unit into a mounted state, the portable measuring unit comprising:
      an image detection unit configured to measure an irradiation pattern generated on a sample by previously irradiating the sample with the energy beam from the apparatus;
      a holding unit configured to hold the image detection unit in a position relative to the sample, wherein the image detection unit is detachable from the holding unit;
      a base plate configured to hold the sample; and,
      wherein the holding unit comprises a plurality of rods, wherein each of the plurality of rods comprises a first end detachably couplable to the image detection unit and a second end detachably couplable to the base plate;
   measuring the sample using the image detection unit;
   evaluating the measurement of the sample to generate a calibration information corresponding to the sample;
   transferring the calibration information to the at least one apparatus that generated the irradiation pattern on the sample.

10. The method of claim 9, wherein the irradiation comprises a grid.

11. The method of claim 9, wherein transferring the calibration information to the at least one apparatus is performed via an interface on the portable measuring unit.

* * * * *